United States Patent [19]

Grachev et al.

[11] 3,842,962

[45] Oct. 22, 1974

[54] APPARATUS FOR CONVEYING PIECE ARTICLES, PARTICULARLY STACKS OF NEWSPAPERS, IN PERPENDICULAR DIRECTIONS

[76] Inventors: Leonid Pavlovich Grachev, ulitsa Serafimovicha, 2, kv. 181; Nikolai Ivanovich Anikanov, Bolshaya Bronnaya ulitsa, 2/6, kv. 6, both of Moscow; Grigory Iosifovich Zaks, ulitsa Mechnikova, 14a, kv. 24, Kiev; Grigory Avramovich Radutsky, 16 Parkovaya ulitsa, 49, korpus 2, kv. 68, Moscow; Rafail Efimovich Kheifets, Brest-Litovsky prospekt, 162, kv. 30, Kiev, all of U.S.S.R.

[22] Filed: Dec. 21, 1972

[21] Appl. No.: 317,432

[30] Foreign Application Priority Data
Dec. 22, 1971 U.S.S.R.............................. 1729194

[52] U.S. Cl. .............................. 198/25, 198/127 R
[51] Int. Cl. ............................................ B65g 47/00
[58] Field of Search .......... 198/127 R, 33 AA, 105, 198/25; 193/35 R, 35 MD, 36

[56] References Cited
UNITED STATES PATENTS
3,058,565  10/1962  Byrnes ................................. 193/36

OTHER PUBLICATIONS

Automation, Oct. 1971, Cleveland Ohio, Denton Pub. Co., p. 11, "Right Angle Transfer Unit Built From Clipped Discs" TJ212A9.

Primary Examiner—Richard A. Schacher
Assistant Examiner—Douglas D. Watts
Attorney, Agent, or Firm—Holman & Stern

[57] ABSTRACT

An apparatus for conveying piece articles, particularly stacks of newspapers, in perpendicular directions wherein the means for changing the direction of conveying of the stacks include discs mounted in rows in spaces intermediate of the rollers of the feeding rollerway, each of the discs having a segment-shaped cutaway portion and being mounted so that the surface defining the cutaway portion is below the top generatrix of the rollers of the rollerway, the discs in each row being mounted on a common shaft of which the axis of rotation is perpendicular to the axes of rotation of these rollers of the rollerway, all of the shafts being operatively connected to a common drive for effecting synchronous rotation of the discs adapted to change the direction of conveying of the stacks to a direction perpendicular to the initial one.

2 Claims, 3 Drawing Figures

APPARATUS FOR CONVEYING PIECE ARTICLES, PARTICULARLY STACKS OF NEWSPAPERS, IN PERPENDICULAR DIRECTIONS

BACKGROUND OF THE INVENTION

The present invention relates to an apparatus for conveying articles, particularly, stacks of newspapers, in perpendicular directions.

Known in the art in an apparatus for conveying articles in perpendicular directions, comprising a feeding rollerway for conveying the articles in a first direction and means for changing the direction of conveying of these articles to a second direction, perpendicular to the first one, arranged in rows intermediate of the rollers of the rollerway. Each of such means for changing the direction of conveying of the articles to the perpendicular includes a system of rollers spaced circumferentially on a common rim mounted in the space intermediate of the rollers of the rollerway, approximately, at the same level with the last-mentioned rollers.

Mounted on the axis of this rim is a sprocket by which the rim is rotated. The sprockets of the rims mounted in the same space intermediate a pair of the rollers of the rollerway are connected by a common driving chain to a drive sprocket.

In order to ensure unopposed conveying of the articles along the rollerway, the rims are arranged so that the generatrices of the rollers, which are at a given moment at the top of the rims, are parallel to the rollers of the rollerway.

To change the direction of conveying of the articles to the perpendicular one, the drive of the rotation of the rims is actuated.

As a result of the small difference between the top levels, respectively, of the rollers of the rollerway and of the rollers mounted on the rims the conveying of the articles in the second direction, perpendicular to the first one, is effected with insufficient reliability, since the articles are liable to lag on the rollers of the feeding rollerway owing to their contact with these last-mentioned rollers. The above is particularly true in the case of deflecting stacks of newspapers off a rollerway, since these stacks have a relatively great area of contact with the rollers of a rollerway, owing to the plasticity of paper.

Moreover, the structure of the above-described known means for changing the direction of conveying of articles is relatively complicated, on account of the necessity of mounting a plurality of rollers on each said rim, each roller having its own bearings, as well as of the necessity of having several drives, one drive for each row of the rims.

This necessity of having an individual drive for each row of the rims brings about a necessity of making the spaces between the adjacent pairs of the rollers of the rollerway sufficiently great to accomodate these rims with their drive means. This fact, in its turn, increases the possibility of appearance of unwanted friction between the articles being deflected off the feeding rollerway and this rollerway, which is particularly true in the case of stacks of newspapers.

SUMMARY OF THE INVENTION

It is, therefore, an object of the present invention to provide an apparatus for conveying articles, particularly, stacks of newspapers, in perpendicular directions, which has a simple structure and which ensures reliable conveying of the stacks of newspapers off the feeding rollerway in a direction perpendicular to the initial one, devoid of unwanted friction.

This and other objects are attained in an apparatus for conveying articles, particularly, stacks of newspapers, in perpendicular directions, comprising a rollerway for conveying the stacks in a first direction and means for changing the direction of conveying of these stacks to a second direction perpendicular to the first one, which means is mounted in rows in the spaces intermediate of the rollers of the rollerway, in which apparatus, in accordance with the present invention, the means for changing the direction of conveying of the stacks include discs, each of the discs having a segment-shaped cutaway portion and being so mounted that the surface defining the cutaway portion is below the upper generatrix of the rollers of the rollerway, the discs of each row being mounted on a common shaft of which the axis of rotation is perpendicular to the axes of rotation of the rollers of the rollerway, all the shafts being operatively connected to a common drive ensuring synchronous rotation of the discs adapted to vary the direction of conveying of the stacks of newspapers to a direction perpendicular to the first one.

These shafts carrying the discs are preferrably connected to the common drive through single-revolution clutch means.

It is advisable that the discs mounted in each space intermediate of a pair of adjacent rollers of the rollerway should be arranged in a checkered order, so that these discs should partially overlap one another.

The essence of the present invention is, as follows.

The means for changing the direction of conveying of the stacks of newspapers being in the form of discs mounted in the spaces between the adjacent pairs of the rollers of the rollerway, each disc having a segment-shaped cutaway portion facing upwardly when the stacks are advanced by the rollerway and being substantially lower than the upper plane, or generatrix of the rollers of the rollerway, there is no unwanted friction between the stacks being advanced by the rollerway and the discs; on the other hand, when the stacks are to be deflected off the rollerway in a direction perpendicular to the initial one, the rotating discs lift the stacks above the rollerway to a substantial height, which eliminates any unwanted friction between the stacks and the rollers of the rollerway.

The discs in each row are supported on a common shaft of which the axis of rotation is perpendicular to the axes of rotation of the rollers of the rollerway, all these shafts being operatively connected to a common drive. The spacing between the rollers of the rollerway is minimal since this spacing is for accomodating the discs alone. This fact increase still further the reliability of conveying the discs in a direction perpendicular to the initial one.

The herein disclosed structure of the means for changing the direction of conveying of the articles, unlike the hitherto known one, is characterized by its simplicity, since the means are nothing but commonly-used discs actuated by a common drive.

BRIEF DESCRIPTION OF THE DRAWINGS

The present invention will be better understood from the following description of an embodiment thereof, with reference being had to the accompanying drawings, wherein.

DETAILED DESCRIPTION OF THE PREFERRED EMBODIMENT

Figure 1:
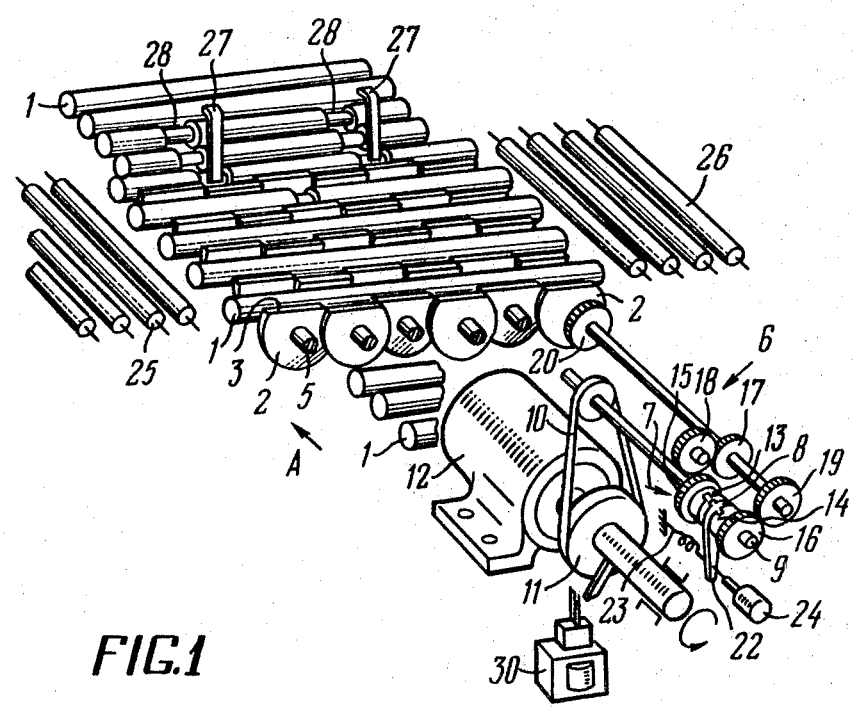
FIG. 1 is a general view of an apparatus for conveying stacks of newspapers in perpendicular directions, with the view of the rollerway being partly cut away.
Figure 2:
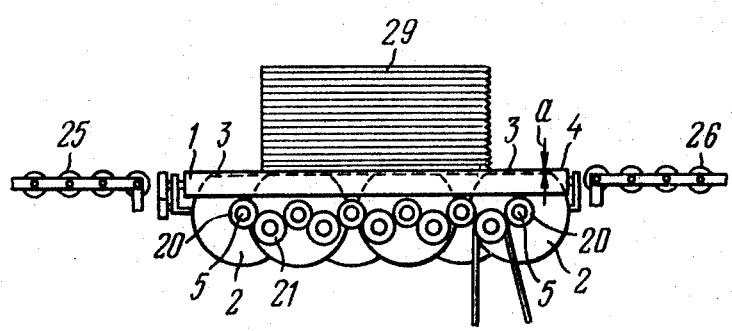
FIG. 2 is a view taken along arrow line A in FIG. 1, with a stack of newspapers brought into the area where the means for changing the direction of conveying of the stacks are disposed.
Figure 3:
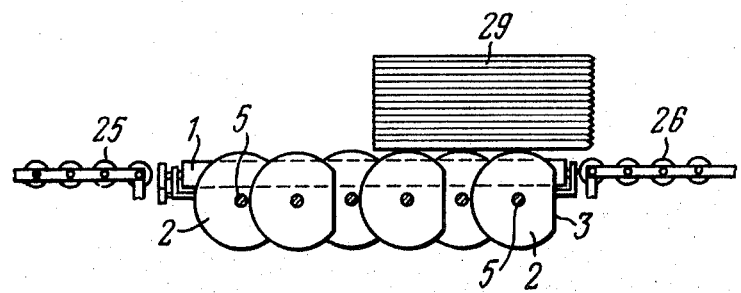
FIG. 3 shows the same, as FIG. 2, but with the discs set into rotation.

Referring now in particular of the invention to the appended drawings, the apparatus comprises a feeding rollerway for conveying successive stacks of newspapers in a first direction, the spaces intermediate the adjacent pairs of the rollers 1 (FIGS. 1 to 3) of the rollerway accommodating several rows of discs 2.

Each disc 2 has a segment-shaped cutaway portion and is so mounted in an initial position that the chordal surface 3 defining this cutaway segment is below the topmost plane, or generatrix 4 of the rollers 1 (FIG. 2) by an extent $a$.

The discs 2 of each row are supported on a common shaft 5 of which the axis of rotation is perpendicular to the axes of rotation of the rollers 1. All the shafts 5 are operatively connected to a common drive system 6 effecting synchronous rotation of the discs 2.

The discs 2 are arranged in each of the spaces intermediate of the adjacent pairs of the rollers 1 in a checkered order and partly overlap one another.

The drive system 6 includes a two-way coupling 7 of which the selector member 8 is keyed (not shown in the drawing) to a shaft 9 operatively connected through a V-belt transmission 10 and a single-revolution clutch 11 to a drive motor 12.

The half-couplings 13 and 14 of the two-way coupling 7 are freely rotatable about the shaft 9 and are rigidly attached, respectively, to gears 15 and 16, the gear 15 being drivingly associated with a gear 17 through an idler pinion 18, and the gear 16 directly meshing with a gear 19. Both gears 17 and 19 are non-rotatably mounted on one of the shafts 5.

All the shafts 5 are operatively interconnected for joint rotation through meshing gears 20 and 21, the gears 20 being non-rotatably mounted directly on the shafts 5.

The selector member 8 of the two-way coupling 7 is displaceable in either direction by a bifurcated arm 22 which is actuated either by a spring 23 or by an electromagnet 24 opposing this spring; when actuated by the spring 23, the arm 22 effects driving engagement of the half-coupling 13 with the shaft 9 through the selector member 8; alternatively, when actuated by the electromagnet 24, the arm 22 effects driving engagement of the half-coupling 14 with the same shaft 9 through the same selector member 8.

Mounted to both lateral sides of the feeding rollerway perpendicularly thereto is a pair of outgoing rollerways 25 and 26, the top plane of the rollers of which is at the same level with that of the rollers 1 of the feeding rollerway. The outgoing rollerways 25 and 26 adjoin the feeding rollerway in the area of the mounting of the means for changing the direction of conveying of the stacks of newspapers.

The feeding rollerway in the area immediately downstream of the discs 2 is associated with a pair of stops 27 pivotable in a vertical plane, the stops 27 being selectively actuated by an electromagnet (not shown) and being adapted to arrest the progress of a stack of newspapers on the feeding rollerway, prior to deflection of this stack onto either one of the outgoing rollerways 25, 26.

Those of the rollers 1 of the feeding rollerway, which are positioned immediately downstream of these stops 27, have portions 28 of reduced diameter, into which the stops 27 can be pivotably lowered to let a stack that is not to be deflected in either direction off the feeding rollerway pass above these stops.

Mounted upstream of the stops 27, in a space intermediate of an adjacent pair of the rollers 1 is a pickup 28 which responds to the presence of a stack in the area of its deflecting and send a command to the single-revolution clutch 11 to set the discs 2 into rotation.

The herein disclosed apparatus operates, as follows.

When a stack is not to be deflected onto either one of the outgoing rollerways 25 and 26 (FIGS. 1 to 3), the pivotable stops 27 are pivoted into the reduced-diameter portions 28 of the respective rollers 1, and the stack is advanced unopposed along the feeding rollerway in the direction of the arrow line A.

If a stack 29 (FIGS. 2 and 3) is to be deflected, e.g. onto the rollerway 26, the electromagnet 24 is energized to effect driving engagement between the shafts 5 carrying the discs 2 and the single-revolution clutch 11 through the half-coupling 14, as has been described hereinabove. Simultaneously, there is energized the magnet (not shown) pivoting the stops 27 into a vertical position.

The stack 29 advancing on the feeding rollerway engages the stops 27 and makes the pickup 28 respond, whereby the latter sends a command to energize the actuating electromagnet 30 of the single-revolution clutch 11. The discs 2 then rotated in a direction toward the rollerway 26 and thus change the initial direction of conveying of the stack 29 to the perpendicular, without varying the orientation of the stack itself.

The diameter of the discs 2 and the size of their outaway segments are so selected that one revolution of the discs will result in the center of gravity of the deflected stack 29 being displaced to overlie the outgoing rollerway.

When a stack of newspapers is to be deflected onto the outgoing rollerway 25, the operation is completely similar to that described hereinabove, with only difference that rotation of the discs 2 is reversed, for the discs to displace the stack onto the rollerway 25, since in this case the electromagnet 24 remains de-energized.

The discs 2 are, in this case, rotated toward the rollerway 25 because the shafts 5 are now operatively connected to the single-revolution clutch 11 through the idle pinion 18.

As it has been made clear by the above disclosure, the herein disclosed apparatus is of a relatively simple structure and ensures reliable deflection of stacks from a feeding rollerway in directions extending at right angles to this rollerway.

What we claim is:

1. An apparatus for conveying stacks of newspapers and the like in mutually perpendicular directions comprising in combination:

a rollerway for conveying the stacks therealong in a first direction;

a series of rotatable rollers of said rollerway disposed relative to one another to define a series of clearance spaces between each adjoining one of said rollers;

a plurality of rotatable driving shafts disposed under said rollerway so that the axis of rotation of each shaft is perpendicular to the axes of rotation of said rollers;

a plurality of discs fixedly mounted on each of said driving shafts and disposed along the shafts such that respective ones of said discs on respective ones of said shafts are successively interposed in said clearance spaces, the discs on adjoining shafts overlapping one another in respective ones of said clearance spaces to define a checkered-pattern disposition of discs on said rollerway, each of said discs having a segment-shaped cutaway portion whose surface is lower than the top generatrix of said rollers so that the stacks may move unimpeded along said rollers in said first direction;

stop means adjustably disposed immediately rearwardly of said checkered-pattern disposition of discs for preventing movement of the stacks at a zone of deflection of the stacks, which zone defines a position on said rollerway when the stacks, from being conveyed in said first direction, are stopped by said stop means and deflected to move in a succeeding direction selectable from the two directions perpendicular to said first direction;

said stop means being pivoted in a vertical plane to be hideably disposed in grooved portions provided in said rollers to permit uninterrupted passage of the stacks beyond said stop means in said first direction;

pickup means operatively associated with said stop means for determining the position of the stacks at said zone of deflection and providing a response output representative thereof;

selectably-directional driving means operatively responsive to said response output for rotating said driving shafts with the discs in selectably respective predetermined opposed directions whereby when said stack is to be deflected in said zone of deflection said stop means stops said stacks therein and said pickup means provides said output response to said driving means whereupon said discs are rotated on said shafts in a predetermined direction to cause deflection of the stacks from movement in said first direction to movement in a second direction selected from the two directions perpendicular to said first direction depending upon said predetermined direction of rotation of the shafts by said selectably-directional driving means.

2. An apparatus as claimed in claim 1, wherein said shafts carrying said discs are operatively connected to said selectably-directional driving means through a single-revolution clutch.

* * * * *